United States Patent [19]

Chang et al.

[11] Patent Number: 5,448,579
[45] Date of Patent: Sep. 5, 1995

[54] POLARIZATION INDEPENDENT PICOSECOND FIBER LASER

[75] Inventors: Kok W. Chang, Sunnyvale; David K. Donald; Hong Lin, both of Palo Alto, all of Calif.

[73] Assignee: Hewlett-Packard Company, Palo Alto, Calif.

[21] Appl. No.: 164,336

[22] Filed: Dec. 9, 1993

[51] Int. Cl.6 ............... H01S 3/098; H01S 3/106; H01S 3/07
[52] U.S. Cl. ............................. 372/6; 372/18; 372/27
[58] Field of Search ............... 372/6, 118, 27, 11, 372/12

[56] References Cited

U.S. PATENT DOCUMENTS 5,005,175 4/1991 Desurvire et al. .................. 372/6
5,189,676 2/1993 Wysocki et al. .................... 372/6
5,222,089 6/1993 Huber ............................... 372/26

FOREIGN PATENT DOCUMENTS 0352974 1/1990 European Pat. Off. ............. 372/6

*Primary Examiner*—Rodney B. Bovernick
*Assistant Examiner*—Robert McNutt

[57] ABSTRACT

A polarization insensitive fiber laser. A pair of 45 degree Faraday rotators are positioned on either end of the fiber gain source. The resulting laser is insensitive to external perturbations with respect to known entrance and exit polarization states of the laser light. Modelocking, both passive and active, is possible. Configuration wherein the fiber is a combination of polarization preserving and Erbium-doped, and a saturable absorber is included provide a self-starting, polarization insensitive modelocked laser.

13 Claims, 10 Drawing Sheets

POLARIZATION INDEPENDENT PICOSECOND FIBER LASER

FIELD OF THE INVENTION

This invention relates to lasers generally, and more particularly to polarization independent fiber lasers.

BACKGROUND OF THE INVENTION

Ever since its discovery, the laser has been considered for solving telecommunications problems because of the high coherence and bandwidth of a laser beam and the simplicity of focusing the laser beam. Laser light and optical fibers are becoming increasingly important in the communications industry. Just as the gap between Einstein's theory (1917) and the building of the first laser (1960) was due to lack of equipment, the maximum exploitation of lasers in telecommunication remains theoretical until key technological developments are realized.

Lasers (Light Amplification through Stimulated Emission of Radiation) can produce continuous or pulsed emission. There are two ways to produce pulse emission: gain switch and modelocking. It is well known that gain switch lasers can provide short optical pulses on the order of milliseconds to microseconds. Modelocked lasers can produce shorter optical pulses, on the order of pico seconds or shorter.

Large laser systems based on modelocked YAG or YIF are used to generate short optical pulse for testing the time response of fiber optic communication system. The time response is related to the maximum rate of transmitting information. As the speed of telecommunications systems increase, the need for a sub-picosecond testing impulse source also becomes more acute.

Since becoming commercially available, Erbium doped fiber has become the preferred gain medium for generating short optical pulses in actively and passively modelocked lasers. Thus, technological improvements have contributed to progress toward creating a laser pulse source for testing the time response of telecommunication systems and for generating repetitive pulses at high data rates. However, a laser which can maintain a single polarization state, essential to maintaining optimal laser activity, has remained a technical barrier.

The polarization state of light can be described by the amplitudes and phase relationship of the two oscillating fields of a light wave. In general, output from a laser or fiber laser has a well-defined single polarization state with a high order of degree of polarization. As this output light propagates in an isotropic medium (i.e. a medium with no birefringence—light travels at the same speed along both axes) the polarization state will not change. However, the output polarization state will vary if light does not travel along the birefringent axis of an anisotropic (birefringent) medium. Although single mode fiber is known to have a very small intrinsic birefringence, it is susceptible to external perturbation (e.g. due to bending, temperature change), which results in changes in birefringence and changes in the polarization state result.

Inside a fiber laser cavity, this externally-induced birefringence will cause the exit, or output, polarization state to vary, if the effect is small, or to cease laser activity entirely if the effect is large. An internal adjustable polarization control element is required in order to maintain the fiber laser in optimal laser condition. This requires constant surveillance and adjustment. The need exists for a polarization independent fiber laser which does not require constant adjusting of the polarization state in the single mode fiber.

Attempts to obtain a well-defined pulse which does not require ongoing adjustment of polarization have been unsuccessful. Currently, polarization controllers are needed to adjust polarization states inside a fiber laser cavity in single frequency ring lasers, and actively and passively modelocked picosecond fiber lasers.

Polarization adjustment is needed because changes in the external environment create variation in polarization birefringence which, in turn, causes variation in polarization states. Variation in polarization states due to changes in birefringence in a single mode fiber means that the amplitude and phase relationship are changed according to the polarization state variation.

Configurations which eliminate optical birefringence effects on the polarization state of a single pass beam have been reported. See Martinelli, "A Universal Compensator for Polarization Changes Induced By Birefringence on a Retracing Beam", *Optics Communications*, vol 72, number 6, pp 341-344 (1989). This device, depicted in FIG. 1, is operated based on the symmetries induced by a 45 degree Faraday rotator 12 followed by a mirror 14. The entrance and exit polarization states of the input and output beams 16, 18 turn out to be orthogonal and independent of the arbitrary birefringence material 20. The arbitrary birefringence material 20 changes the input beams 12 known polarization state into an arbitrary elliptical unknown polarization state 22.

The 45 degree Faraday rotator rotates the major axes of the arbitrary elliptically polarized light beam 22 by 45 degrees without changing its ellipticity and handedness (right or left handed) to a new polarization state 24. The mirror 14 changes the handedness of the reflected beam 26 from right to left (or left to right, depending on the initial state) without affecting the ellipticity and the orientation of the major axes of the elliptically polarized beam. The 45 degree Faraday rotator rotates the major axis of the elliptically polarized reflected beam 26 another 45 degrees without changing its handedness (left or right handed) and ellipticity to the output beams 18 orthogonally polarized state 28 which is orthogonal to that of the input beam's 16 arbitrary elliptically polarized state.

As the orthogonally polarized reflected beam 28 passes the arbitrary birefringence material 20, the beam sees opposed birefringence when compared to the input beam 16 and cancels the birefringence induced to the input beam 16. Cancellation of birefringence has the practical effect of switching the fast and slow axis of the arbitrary birefringence material 20 and undoing the birefringence effect induced to the input beam 16 by the arbitrary birefringence material 20. As a result, the output or exit polarization 18 will still be well-defined, but it will be orthogonal to that of the known input or entrance beam 16 polarization state.

In sum, this means:
a) for linearly polarized input beam, the output polarization state will remain linearly polarized with its polarization axes rotated by 90 degrees;
b) for circularly polarized input beam (right or left handed), the output polarization state will remain circularly polarized with opposite handedness (left or right handed);

c) for elliptically polarized input beam, the output polarization state will remain elliptically polarized with its major axis rotated 90 degrees, opposite handedness and unchanged ellipticity.

Without the 45 degree Faraday rotator, the relationship of the output polarization state 18 (after passing the arbitrary material 20, reflected by mirror 14, and passing the arbitrary medium the second time) to the input polarization will be random, not well-defined, and will vary with changes in the external environment. Thus, the addition of the 45 degree Faraday rotator created a persistent, well-defined relationship between the input and output polarization states.

This principle of using a Faraday rotator to cancel birefringence is used by Duling and Esman in their recent paper describing a linear input followed by a 45 degree Faraday rotator and a mirror. The resulting output is orthogonal to the input and the amplitude of the output is increased. See Duling and Esman, "A Single Doped Er-Doped Fiber Amplifier", 1992 Conference of Lasers and Electro-optics, CPD 28-1/60, Duling and Esman (1992).

As depicted in FIG. 2, Duling et al. report a single polarization fiber amplifier which consists of a polarization beam splitter 30, a standard (commercially available) Erbium-doped fiber 32, and a Faraday rotator mirror 34. On retracing its path, light is everywhere orthogonal to the first pass light and is linear when reflected. Horizontally linearly polarized light from a polarization maintaining (PM) fiber is input from port 1 through the polarization beam splitter 30 and into the nonpolarization maintaining Erbium-doped fiber 32. The light is then reflected back from the Faraday rotator 34 for a second pass through the Erbium-doped fiber 32. On retracing its path, the polarization state of the second pass light is everywhere orthogonal to the polarization state of the first pass light and is vertically linearly polarized as it exits through the polarization beam splitter 30 out to port 2.

Duling has also described two possible laser configurations based on this single polarization fiber amplifier. FIG. 3 shows a narrow linewidth using an additional mirror 36 and a grating 38 to produce continuous wave (CW) laser action that is independent of the birefringence of the fiber. In this laser cavity, two reflective ports are required together with the Faraday rotator 34 to sustain the laser action.

Duling also demonstrated the use of the single frequency, single polarization fiber traveling wave amplifier together with polarization maintaining fiber 40 to build a narrow linewidth in-line fiber laser. (See FIG. 4).

In summary, Duling demonstrated two CW lasers based on use of single polarization fiber amplifier. Thus, a single Faraday rotator has been used to cancel birefringence in a fiber laser. However, there still remains a need for an ultrashort pulse fiber laser which does not require constant tuning and adjusting to control polarization states and thereby optimize laser action.

SUMMARY OF THE INVENTION

The invention provides a pulse fiber laser which eliminates the need for adjusting polarization states within the fiber laser cavity. No adjustment is necessary because the birefringent effect in the fiber laser cavity is compensated. Thus, a single mode-locked fiber laser supports the laser activity of a single polarization state and eliminates the need for a polarization controller.

The need for a polarization controller is eliminated by the placement of two 45 degree Faraday rotator mirrors at either end of the amplifying fiber in the laser. The Faraday rotator mirrors cancel out the birefringence in the fiber and allow laser activity of a single polarization state which has the lowest round trip loss inside the cavity. In the case where there is no polarization dependent loss in the fiber cavity, a linear polarizer or a polarization beam splitter is used at one end of the laser cavity to force the laser to function at a single polarization state.

A means of amplitude dependent loss is used in one end of the laser cavity to encourage the generation of short optical pulse. Further, the laser has the advantage of double-pass gain since the mode-locked pulse has orthogonal polarization states in the forward and reverse direction.

Other aspects and advantages of the present invention will become apparent from the following detailed description, taken in conjunction with the accompanying drawings, illustrating by way of way of example the principles of the invention.

DETAILED DESCRIPTION OF THE INVENTION

Figure 1:
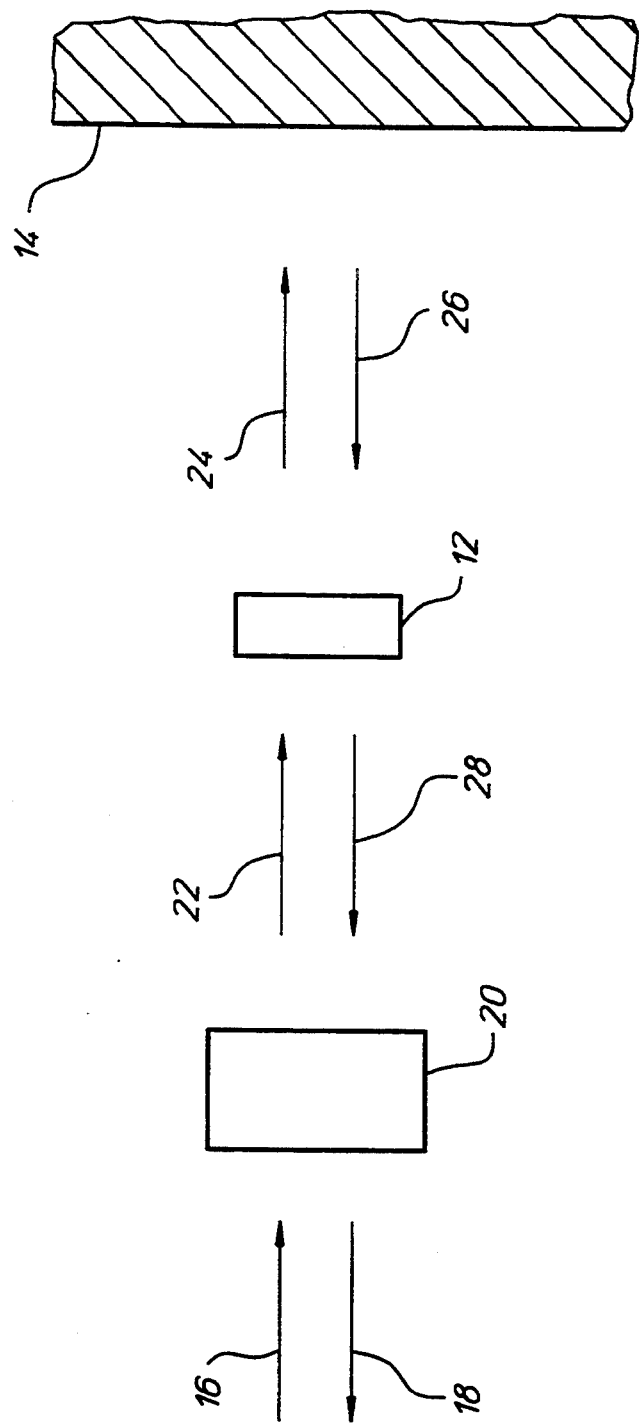
FIG. 1 is a simplified diagram of a prior art configuration controlling exit state polarization.
Figure 2:
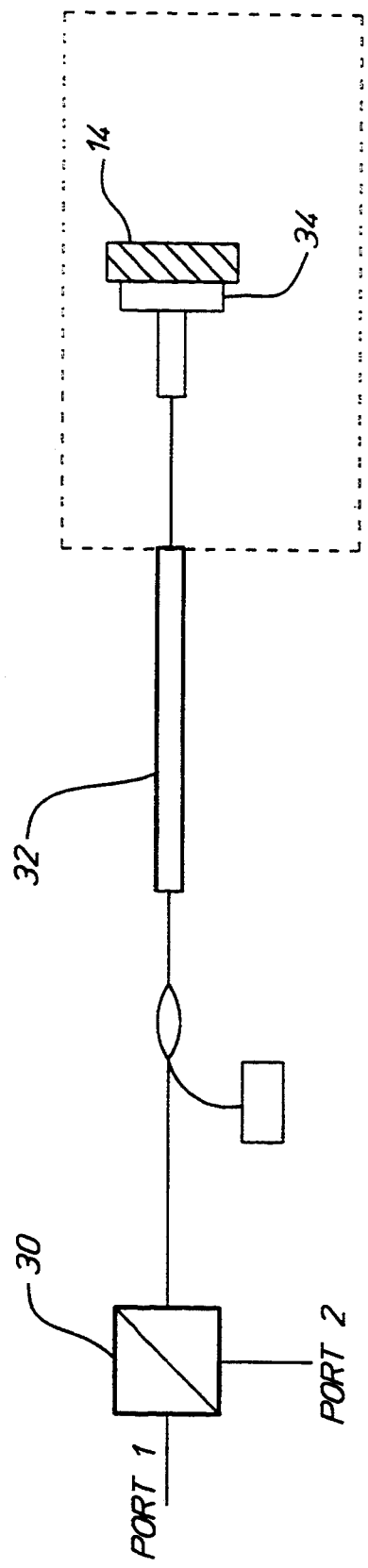
FIG. 2 is a simplified diagram of a prior art single mode polarization fiber amplifier.
Figure 3:
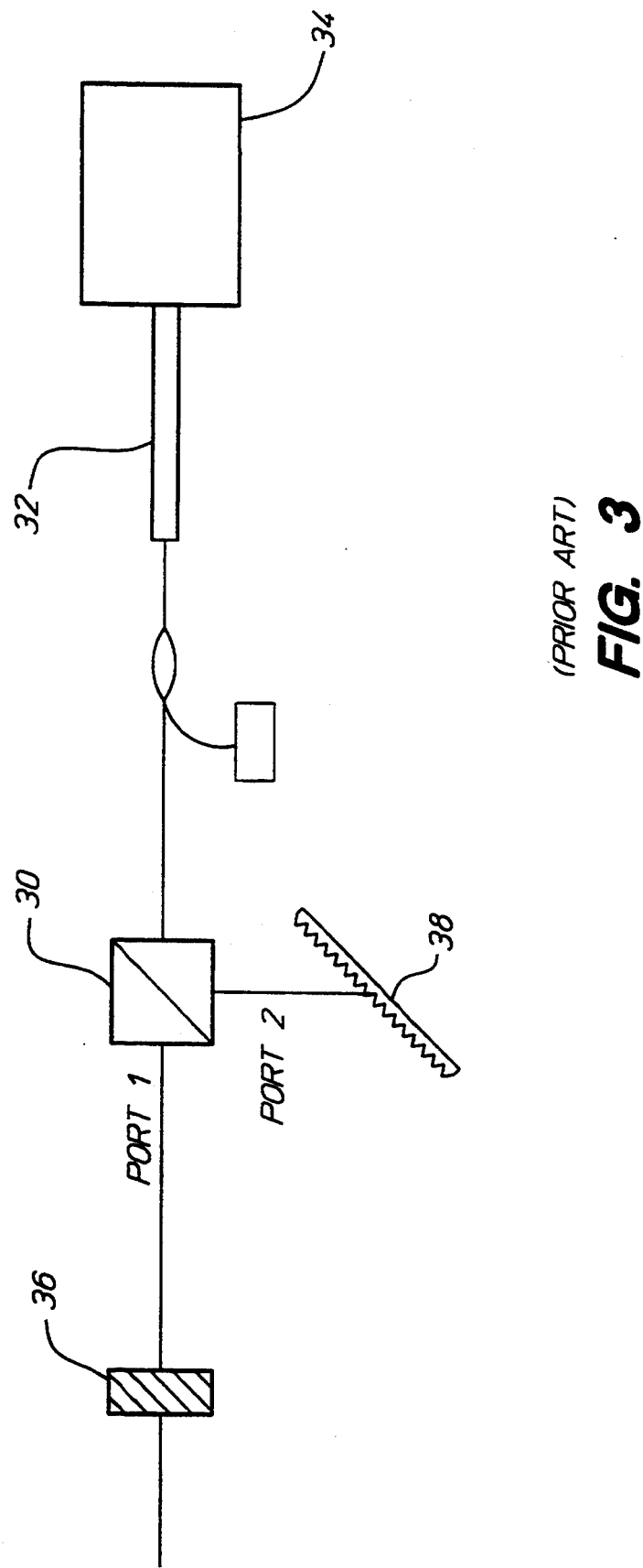
FIG. 3 is a simplified diagram of prior art.
Figure 4:
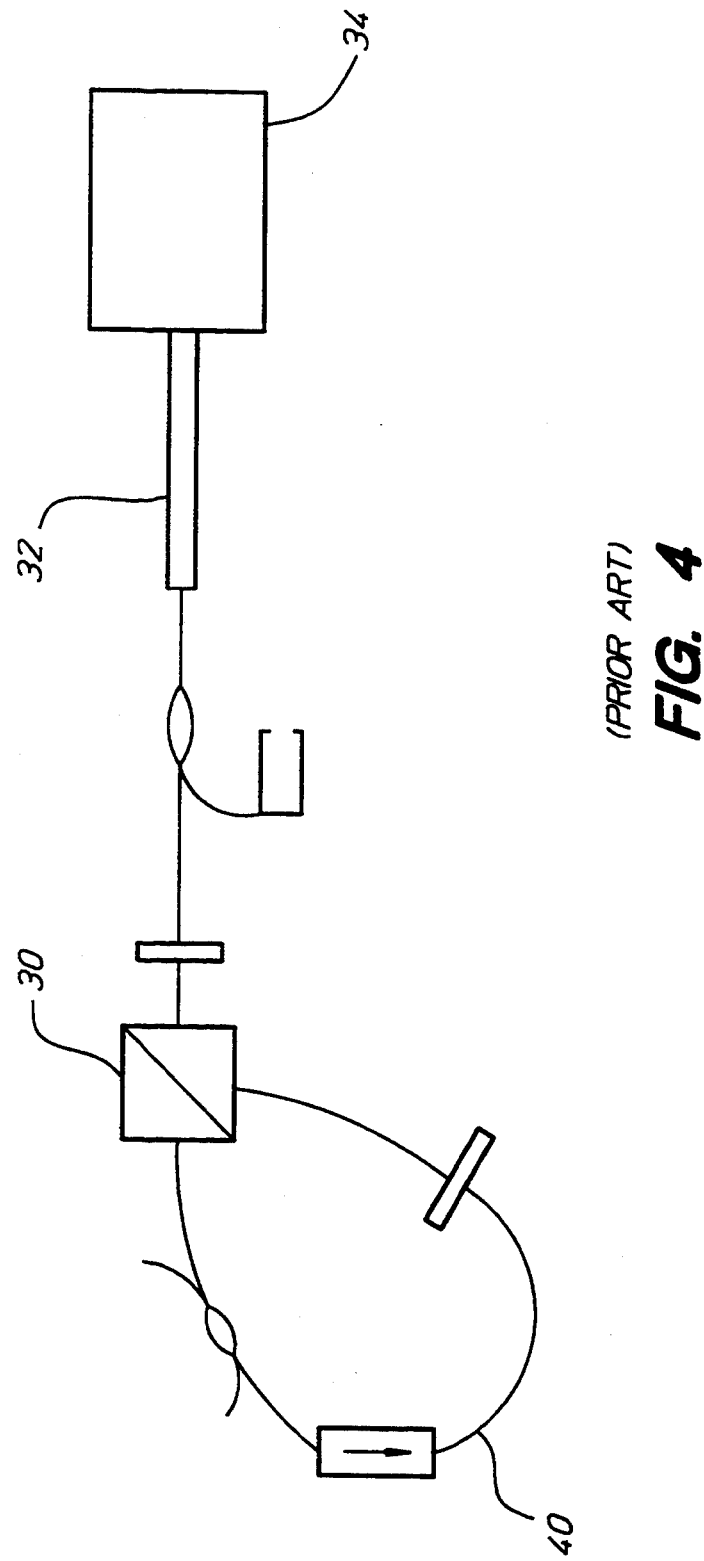
FIG. 4 is another simplified diagram of prior art.
Figure 5:
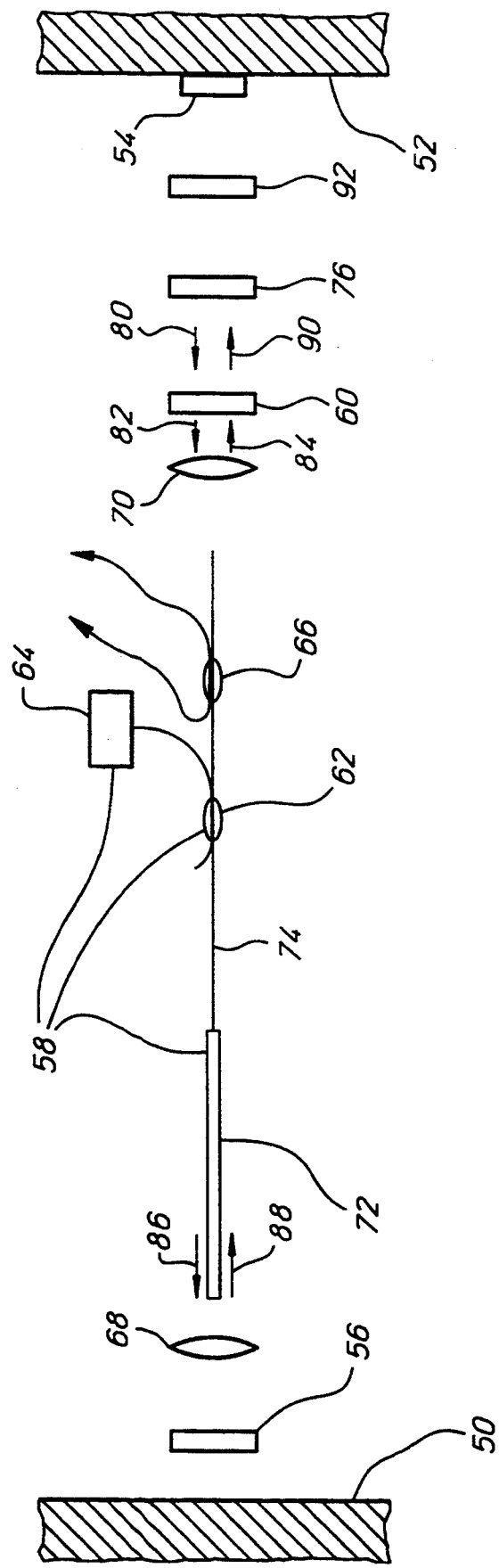
FIG. 5 is a simplified diagram of a preferred embodiment of the invention.

As shown in FIG. 5, the present invention provides a fiber laser which generates a short optical pulse without the need for polarization adjustment.

A laser according to the present invention comprises first and second reflective mirrors 50, 52 defining an optical path; a device to encourage pulsing 54 (which may be a saturable absorber, a semiconductor amplifier or an electro optic phase or amplitude modulator, such as a LiNbO phase modulator or similar functioning device) positioned in the optical path; a first Faraday rotator 56 in the optical path, operative to rotate light 45 degrees; an amplifying means 58 in the optical path; a second 45 degree Faraday rotator 60 in the optical path positioned at the end of the amplifying means 58 opposite the first Faraday rotator 56. A wavelength division multiplexer (WDM) coupler 62 is coupled to a pump 64 which provides gain for the amplifying means 58. A 90:10 fiber coupler 66, which serves as output means, is in the optical path spliced to the amplifying means 58. Further, there may be included a first and second lens 68, 70 in the optical path and positioned one on either end of the amplifying means 58. The amplifying means 58 includes an Erbium doped fiber 72 which is coupled to the WDM coupler 62 and a single mode fiber (SMF) 74. Other doped fibers or pumping mechanisms may be suitable.

This configuration will support laser activity of a single polarization state that experiences lowest loss around the linear cavity formed containing the two 45 degree Faraday rotators 56, 60. The saturable absorber provides a means of amplitude dependent loss that encourages passive or active modelocking. In general, when the laser is passively modelocked, it will produce pulses of sub-picosecond or shorter. The laser can be actively modelocked by using an external RF drive frequency to modulate phase in the fiber cavity to encourage active modelocking. This may produce pulses with higher repetition rate with pulse sweep of between 10 and 20 picoseconds.

In the case where there is no polarization dependent loss in the fiber laser cavity a linear polarizer or a polarization beam splitter 76 is disposed in the optical path between the second 45 degree Faraday rotator 60 and the device to encourage pulsing 54 to encourage single polarization pulsing.

Figure 6:
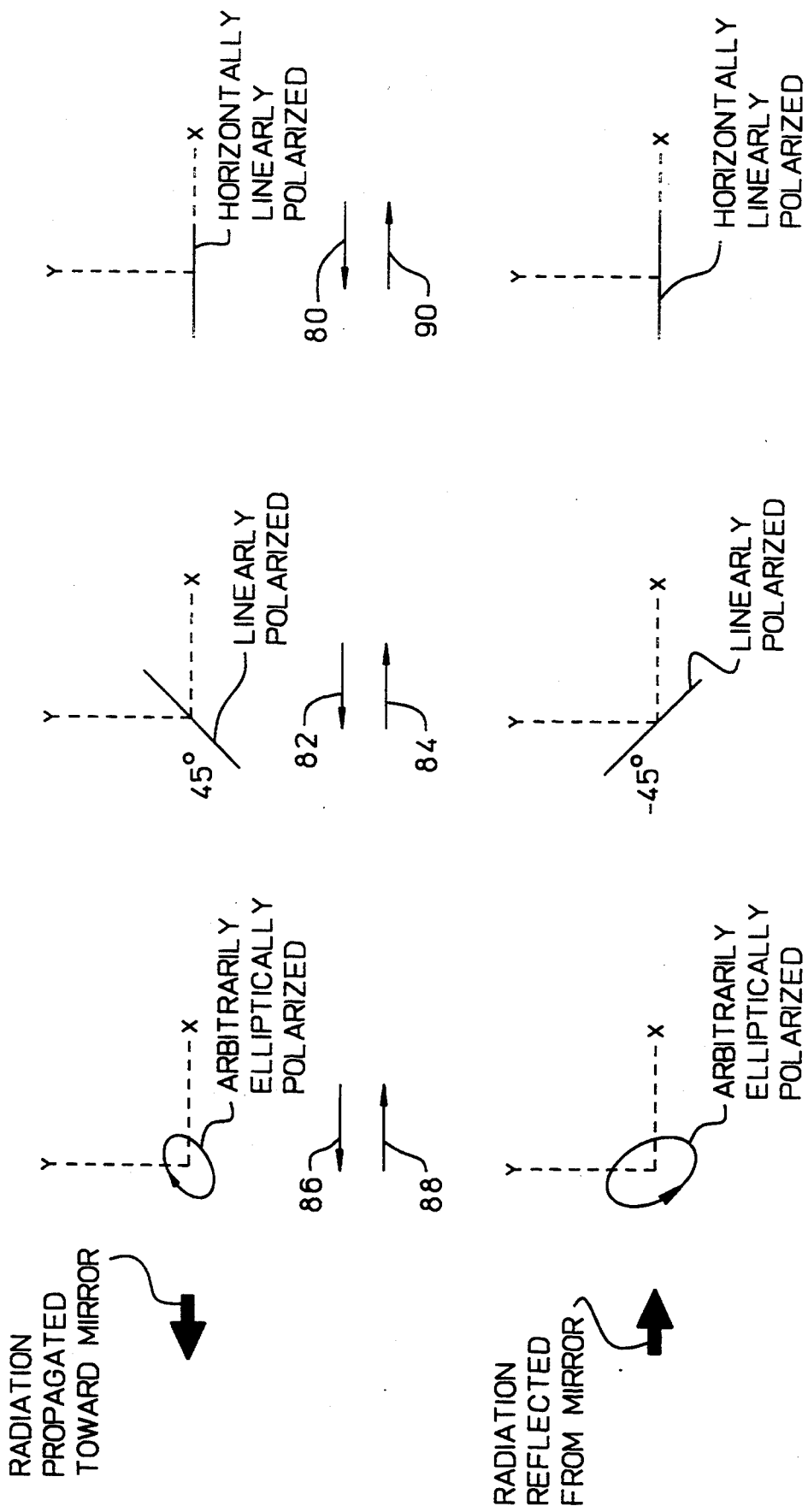
FIG. 6 depicts the evolution of polarization states occurring within a configuration of the invention as shown in FIG. 5.

FIG. 6 shows linear polarization state 80 is defined by the orientation of the linear polarizer, which is set at either the horizontal or vertical axis. The second Faraday rotator changes the polarization state 80 by 45 degrees to a new polarization state 82 as the radiation beam passes through the second Faraday rotator from the polarizer or polarization beam splitter.

Referring again to FIG. 5, the function of the combination of the first 45 degree Faraday rotator 56 in conjunction with the first mirror 50 and the Er-doped fiber 72 is to both provide gain of the input 45 degree rotated linear polarization state (from the second Faraday rotator) and to change its polarization state 84 (FIG. 6) to −45 degree as it reflected back toward the second Faraday rotator 56. Note that the first pass polarization state 86 inside the fiber section is always orthogonal to the second pass polarization state 88 as the light is reflected back by the Faraday rotator 60. As the light passes through the second Faraday rotator 60 in the course of propagating from the amplifying means 58 towards the device to encourage pulsing 54 (which may be a saturable absorber), the second Faraday rotator 60 will change the light back to its initial polarization state 90 (i.e. parallel to the linear polarizer). Hence, the light beam will pass the polarizer or polarization beam splitter 76 (FIG. 5) without experiencing any loss. The saturable absorber or other device to encourage pulsing 54 provides a means of amplitude dependent loss that, depending on the configuration, may encourage either passive modelocking or active modelocking. In general, when the laser is passively modelocked, it will produce pulses of sub-picosecond or smaller.

The laser can be actively modelocked by using an external radio frequency (RF) drive frequency to modulate the loss or phase in the fiber cavity to encourage active modelocking. This produces pulses with higher repetition rates with pulse sweeps of between 10 and 20 picoseconds. The laser may also include a filter 92 (FIG. 5) to tune light for active modelock positioned in the optical path, placed between the amplifying means 58 and the second Faraday rotator 60.

Figure 7:
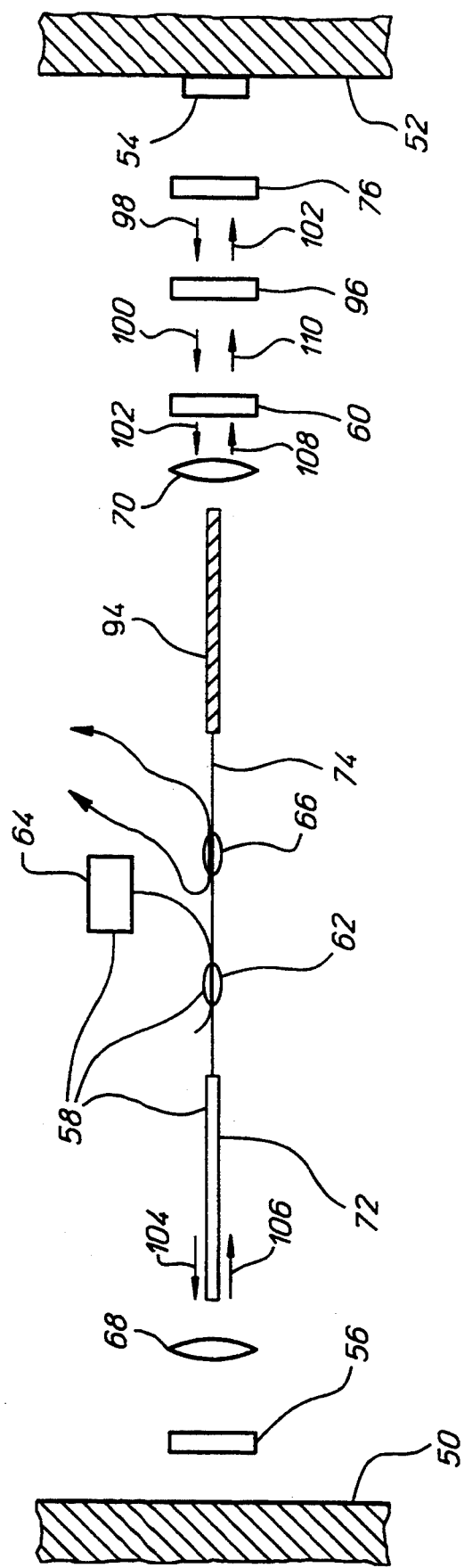
FIG. 7 is a simplified diagram of an alternate embodiment of the invention.

FIG. 7 shows an alternate embodiment of the present invention in which an additional section of polarization fiber (PPF) 94 is inserted in the laser cavity between the second Faraday rotator 60 and the single mode fiber 74 section of the amplifier. One of the birefringence axes of the PPF 94 is aligned horizontally. The orientation of the linear polarizer or polarization beam splitter (PBS) 76 is also aligned with the horizontal axis. A zero order quarter wave plate 96 is inserted between the second Faraday rotator 60 and the PBS 76 to adjust the amount of light feedback into the polarization preserving fiber 94 and to introduce non-linear polarization rotation inside the polarization maintaining fiber.

Figure 8:
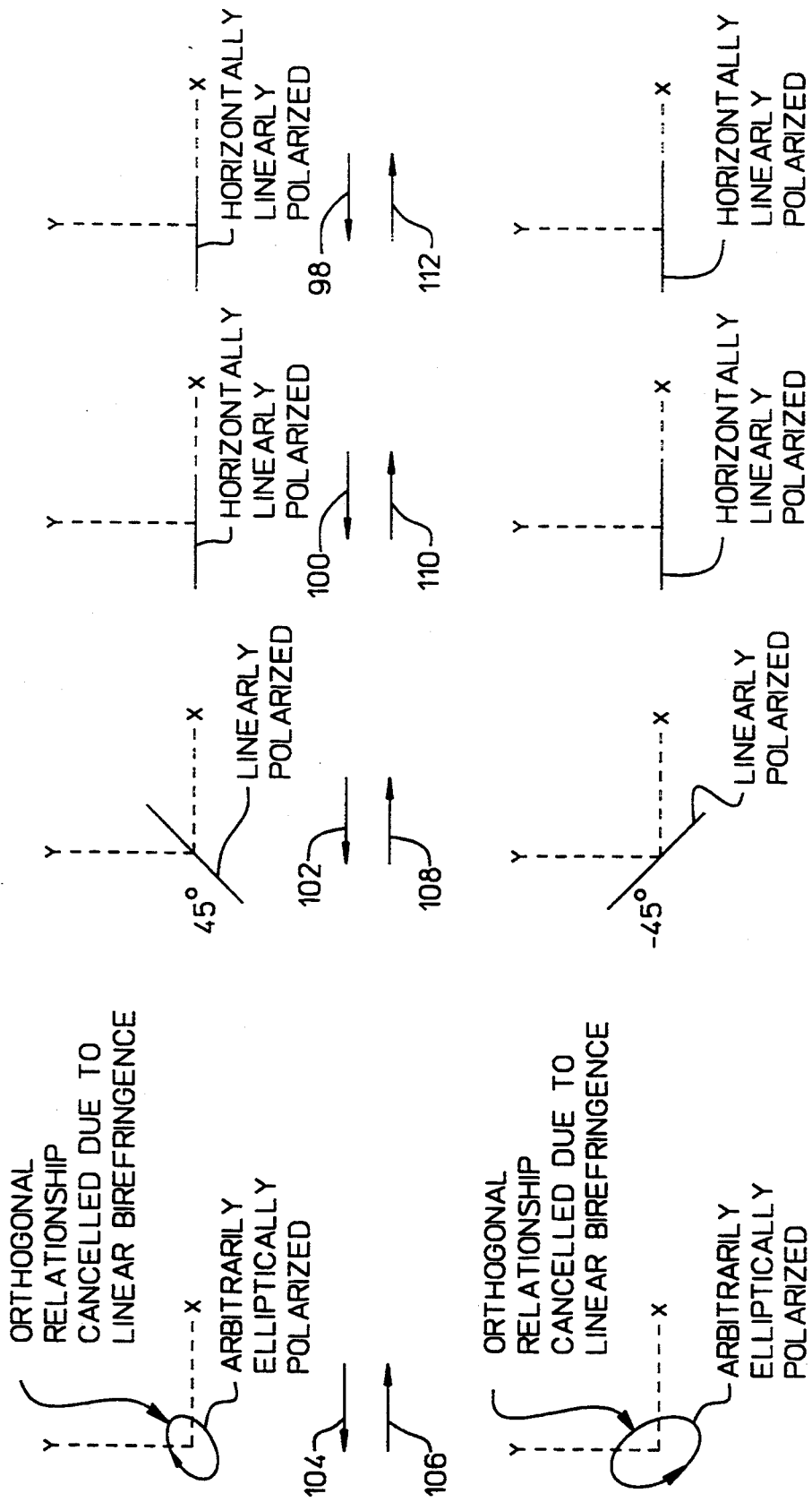
FIG. 8 depicts the evolution of polarization states occurring within the embodiment as shown in FIG. 7 with the quarter wave plate at 0 degrees.

The orientation of the birefringent axis of the quarter wave plate 96 will change the laser characteristic of the laser from lasing at a continual wave mode to lasing at a passively modelocked mode or to a nonlasing superluminescent mode. When the birefringent axis of the quarter wave plate 96 is aligned with the linear polarizer or PBS 76 the fiber laser cavity has minimum loss for the laser to lase at continual wave mode, with its polarization state evolving through the fiber laser cavity as shown in FIG. 8.

The light reflected from the second mirror 52 is horizontally polarized by the linear polarizer 76. The horizontally polarized light beam 98 passes the quarter wave plate 96 without changing its polarization state 100 since one of the birefringent axis of the quarter wave plate 96 is also oriented horizontally. As the beam travels through the second Faraday rotator 60, its polarization state 102 changes from horizontally polarized to 45 degree linearly polarized. Since one of the birefringent axis of the polarization preserving fiber is also oriented horizontally, the 45 degree linearly polarized beam will split equal amount of its electric field between the fast and slow birefringent axis of the PPF fiber, and its polarization state will evolve from +45 degree linearly polarized to elliptically polarized (right or left hand), to circularly polarized (right or left hand), and then back to elliptically polarized (right or left hand) to −45 degree linearly polarized, to elliptically polarized (left or right handed) to circularly polarized (left or right hand) to elliptically polarized (right or left handed) and back to +45 degree linearly polarized as the beam propagates through the PPF to the single mode fiber.

As the light continues to propagate from the single mode fiber section 74 through the Erbium-doped fiber 72 section to the first 45 degree Faraday rotator 56 and the first mirror 50, the polarization state evolves unpredictably (because it is a function of external influences). However, as the reflected beam propagates back from the first mirror 50 through the first 45 degree Faraday rotator 56, its polarization state 106 will become orthogonal to that of the forward or first pass input light polarization state 104. The beam will continue to propagate through Erbium-doped fiber 72 through SMF 74 and the PPF fiber 94 maintaining this orthogonal relationship throughout. Therefore, the polarization state of light at the output of the PPF fiber is −45 degree linearly polarized.

The function of the second 45 degree Faraday rotator is to rotate the −45 degree linearly polarized reflected light 108 back to horizontally polarized 110, hence this backward traveling light can again pass the quarter wave plate 96 without changing its polarization state and is able to pass the linear polarizer without loss.

Another important fact is that the counterpropagated light has equal amounts of electric field projected onto the fast and slow birefringent axes of the polarization preserving fiber. Hence, there is no nonlinear polarization rotation inside the PPF. Under these conditions, if the gain (amplifying) section of the fiber laser has provided enough gain to overcome the loss in the laser cavity, the laser will be lasing at a continuous wave mode.

Figure 9:
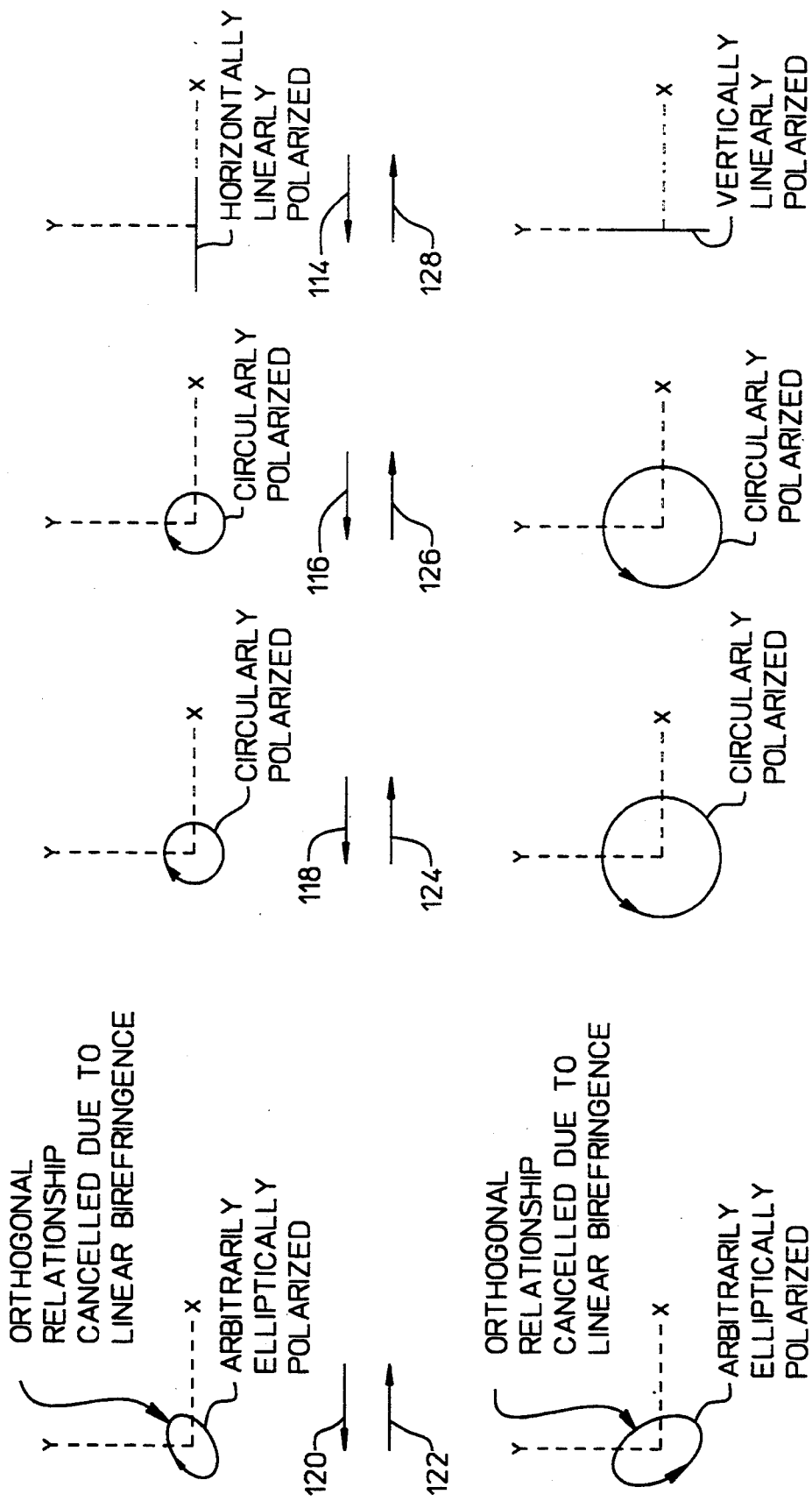
FIG. 9 depicts the evolution of polarization states occurring within the embodiment as shown in FIG. 7 with the quarter wave plate at 45 degrees.

When the birefringent axis of the QWP is aligned 45 degrees with respect to the linear polarizer, the fiber laser cavity 40 has maximum loss and the cavity will produce superluminescent noise at the output but will not lase. Its polarization state will evolve through the fiber laser cavity as shown in FIG. 9.

The polarization state of the radiation 114 propagated from the second mirror through the horizontally oriented polarizer or PBS 76 is horizontally polarized by the linear polarizer. As the horizontally polarized light beam passes the QWP 96, its polarization state 114 will change to circularly polarized (right or left handed) 116. As the beam travels through the second Faraday rotator, its polarization state 116 remains circularly polarized, (right or left handed) 118. The circularly polarized beam 118 will split equal amount of its electric field between the fast and slow birefringent axes of the PPF fiber 94, and the beams polarization state will evolve from circularly polarized (right or left hand), to elliptically polarized (right or left) to linearly polarized (−45 degrees or +45 degrees) and then elliptically polarized (left or right) and then to circularly polarized (left or right hand), and then back to elliptically polarized (left or right hand) to linearly polarized +45 or −45 degrees, to elliptically polarized (right or left handed) and finally back to circularly polarized (right or left) as the beam propagates through the PPF to the single mode fiber.

As discussed earlier, the function of the combination of the SMF section, the Erbium-doped fiber section, the first Faraday rotator and the first mirror is to reflect the light beam orthogonally 120, 122 back to the PPF fiber section. Therefore the polarization state 124 at the output of the PPF fiber became circularly polarized (left or righthanded). The circularly polarized light 124 will not change it polarization state 126 as it passes through the second Faraday rotator 60 to the quarter wave plate (QWP) 96. However, the QWP 96 will change the polarization state of the reflected light from circularly polarized (left or righthanded) 126 to vertically polarized 128. Therefore the light cannot pass the PBS 76 and the beam experiences maximum loss. Hence, although the Erbium-doped fiber amplifier section provides gain to the cavity, the loss is too large to be overcome and the cavity will not lase.

Figure 10:
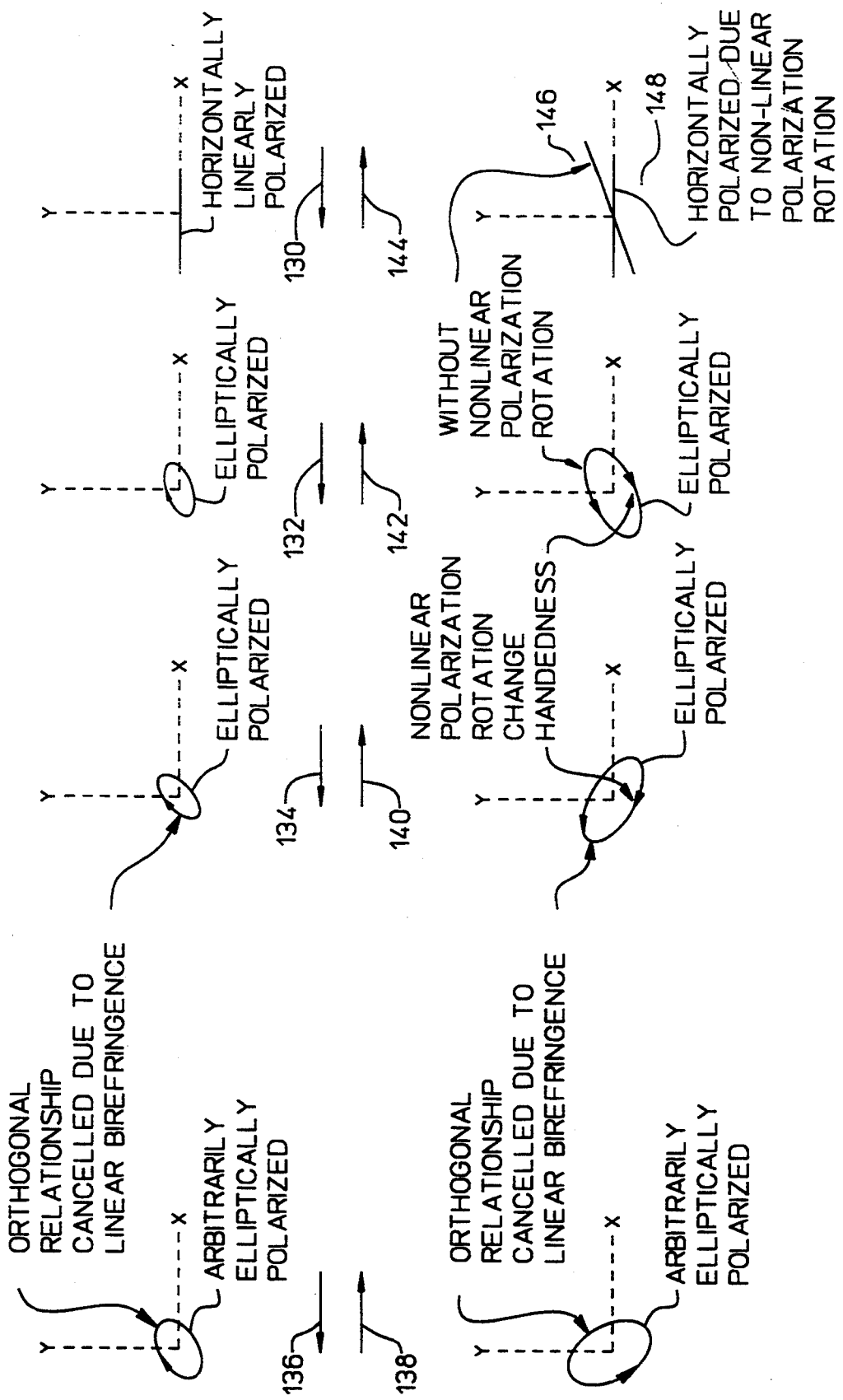
FIG. 10 depicts the evolution of polarization states occurring within the embodiment associated as shown in FIG. 7 with the quarter wave plate at between 10 and 15 degrees and including the effect of high signal power.

Finally, as depicted in FIG. 10, when the birefringent axis of the QWP 96 is rotated or adjusted between zero degrees and 45 degrees with respect to the linear polarizer, or PBS 76 the fiber laser cavity has higher loss for CW lasing. However, in the neighborhood of 10–15 degrees, the non-linear rotation polarization effect in the PPF becomes strong and favors passive mode locking for the cavity generating ultrashort optical pulse. This can be described as follows. The polarization state 130 of the light propagated from the second mirror 52 through the horizontally oriented polarizer or PBS 76 is horizontally polarized by the linear polarizer. The horizontally polarized beam passes the 10–15 degree rotated quarter wave plate 96. Its polarization state 130 will change to elliptically polarized (right or lefthanded) 132, with its major axis rotated 10–15 degrees. The second 45 Faraday rotator 60 will rotate the major axis of the elliptically polarized beam 132 from 10–15 degree to 55–60 degree 134.

This elliptically polarized beam 134 will enter the polarization preserving fiber; its polarization state evolutes similarly to that described above. However, since the input light is elliptically polarized with its major axis oriented 55–60 degree, the amount of electric field projected onto the fast and slow axes are no longer similar. This causes the non-linear polarization effect to increase.

Although the reflected beam has its polarization state 140 orthogonal to the input polarization state 134 at the output of the PPF, the non-linear polarization rotation could change this orthogonal relationship. When there is no nonlinear polarization, the reflected beam state is orthogonal to the input polarization state which elliptically polarized (left or right) with its major axis at 145–150 degrees. If the non-linear polarization is strong enough, the non-linear effect will reverse the handedness of the orthogonal beam from the left/righthanded orientation to right/lefthanded.

As this elliptically polarized beam 140 passes the second Faraday rotator, its major axis will rotate another 45 degrees to 190–195 degrees (which is equivalent to 10–15 degrees) 142. Without the non-linear effect, the elliptically polarized beam (left or right) with its major axis oriented 10–15 will pass the WP and change its polarization to linearly polarized light with its polarization axis making a 20–30 degree angle with respect to the linear polarizer, and experiencing loss 144. On the other hand, the non-linear effect that reverses the handedness, will cause the elliptically polarized light (right or lefthanded) with it major axis oriented at 10–15, to change its polarization state to horizontally polarized 148 as it passes through the QWP. Therefore, the non-linear polarization rotation provides the minimum loss for the laser cavity and the cavity favors passive modelocking.

Essentially, it is the combination of the non-linear effect in the polarization preserving fiber (PPF) in conjunction with the angular adjustment of the wave plate which effectively configures a modelocked laser cavity. The modelocked laser does not include a saturable absorber (or other device for encouraging amplification). Rather, the modelocked laser relies on the gain from the Erbium-doped fiber and the nonlinear polarization rotation attributable to the PPF. Since the Erbium-doping is acting as an amplifier, it brings the non-linear characteristics of the polarization preserving fiber (PPF) into play. Hence, the amplification encouraging aspects of the saturable absorber are replaced by the non-linear effects in the polarization preserving fiber (PPF).

Where a saturable absorber, or like feature, is added to the laser cavity in addition to the polarization preserving fiber, the result is a self-starting laser that is both polarization insensitive and passively modelocked.

The laser can be actively modelocked by using an external radio frequency (RF) drive frequency to modulate the phase in the fiber cavity in order to encourage active modelocking. Active modelocking produces pulses with higher repetition rates, with pulse sweeps of between 10 and 20 pico seconds. The laser may also include a filter 34 to tune light for active modelock positioned in the optical path, placed between the amplifying means and the second Faraday rotator, or elsewhere in the optical path.

Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. A fiber laser comprising:
   first and second reflecting surfaces defining an optical path therebetween;
   pulse means in the optical path adjacent to the second reflector;
   a first Faraday rotator in the optical path adjacent the first reflector;
   a second Faraday rotator in the optical path adjacent the pulse means;
   an optical amplifier consisting of a combination of single mode fiber and doped fiber with environment dependent birefringence between the Faraday rotators;
   a pump laser coupled to the optical amplifier to provide gain through the excitation of the doped fiber; and
   an output coupler coupled to the optical amplifier which provides laser light an exit path from the cavity.

2. A laser as in claim 1, further comprising a polarizer disposed in the optical path between the pulse means and the second Faraday rotator.

3. A laser as in claim 2, wherein the optical amplifier consists of polarization preserving fiber adjacent to the second Faraday rotator and doped fiber.

4. A laser as in claim 3, further comprising a quarter wave plate which is inserted between the polarizer and the second Faraday rotator in order to adjust the amount of light feedback into the laser cavity.

5. A laser as in claim 3, wherein the linear polarizer polarization axis is aligned with the birefringent axis of the polarization preserving fiber.

6. A laser as in claim 1, further comprising a pair of lenses in the optical path and positioned on either end of the optical amplifier.

7. A laser as in claim 1, wherein the optical amplifier includes Er-doped fiber.

8. A laser as in claim 1, wherein the pulse means is a semi-conductor amplifier.

9. A laser as in claim 1, wherein the pulse means is a saturable absorber.

10. A laser as in claim 1, wherein the pulse means is an electro absorption modulator.

11. A laser as in claim 1, wherein the pulse means is a LiNbO$_3$ phase modulator.

12. A laser as in claim 1, further comprising a filter in the optical path.

13. A laser as in claim 12, where the doped fiber is Erbium doped fiber.

* * * * *